(12) United States Patent
Matsuda (10) Patent No.: US 7,328,938 B2
(45) Date of Patent: Feb. 12, 2008

(54) SIDE IMPACT LOAD TRANSMITTING STRUCTURE

(75) Inventor: Hidenori Matsuda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 11/366,537

(22) Filed: Mar. 3, 2006

(65) Prior Publication Data

US 2006/0202513 A1 Sep. 14, 2006

(30) Foreign Application Priority Data

Mar. 10, 2005 (JP) .............................. 2005-068117

(51) Int. Cl.
*B60N 2/427* (2006.01)
(52) U.S. Cl. .............................. 296/187.12; 296/68.1; 297/216.16
(58) Field of Classification Search ............... 296/68.1, 296/65.13–65.15, 187.05, 187.12; 180/274; 280/748, 784; 297/216.1, 216.16–216.18
See application file for complete search history.

(56) References Cited

U.S. PATENT DOCUMENTS

| | | | | |
|---|---|---|---|---|
| 3,944,276 | A * | 3/1976 | de Rosa et al. | 296/65.13 |
| 4,438,969 | A * | 3/1984 | Kamijo et al. | 296/146.9 |
| 4,451,078 | A * | 5/1984 | Maeda | 296/187.12 |
| 4,934,751 | A * | 6/1990 | Shimoda | 296/203.03 |
| 5,435,618 | A * | 7/1995 | Sacco et al. | 296/187.12 |
| 5,584,525 | A * | 12/1996 | Nakano et al. | 296/68.1 |
| 5,954,390 | A * | 9/1999 | Kleinhoffer et al. | 296/203.01 |
| 6,053,567 | A * | 4/2000 | Ito | 296/203.01 |
| 6,168,228 | B1 * | 1/2001 | Heinz et al. | 296/187.12 |
| 6,176,543 | B1 * | 1/2001 | Nawata et al. | 296/68.1 |
| 6,237,991 | B1 * | 5/2001 | Weber | 296/187.12 |
| 6,299,238 | B1 | 10/2001 | Takagi | |
| 6,299,239 | B1 | 10/2001 | Sagawa | |
| 6,422,631 | B1 * | 7/2002 | Schmidt et al. | 296/68.1 |
| 6,502,887 | B1 * | 1/2003 | Lansinger | 296/65.13 |
| 6,568,745 | B2 * | 5/2003 | Kosuge et al. | 296/193.02 |
| 6,604,599 | B2 * | 8/2003 | Yamaguchi et al. | 180/271 |

(Continued)

FOREIGN PATENT DOCUMENTS

FR    2 231 215    12/1974

(Continued)

OTHER PUBLICATIONS

European Search Report dated Jul. 13, 2006.

*Primary Examiner*—D. Glenn Dayoan
*Assistant Examiner*—Greg Blankenship
(74) *Attorney, Agent, or Firm*—Finnegan, Henderson, Farabow, Garrett & Dunner, LLP (57) ABSTRACT

A side impact load transmitting structure includes: a vehicular seat disposed in a cabin; a tunnel portion that is disposed such that it protrudes upward into the cabin and extends in a front-rear direction of a vehicle body; a load transmitting member including a load receiving portion that is disposed at the underside of the vehicular seat and receives a side impact load acting on a vehicle body side portion at the time of a side impact collision, with the load transmitting member being configured to transmit the side impact load received by the load receiving portion to the tunnel portion; and a downward movement suppressing member that suppresses the downward movement of the load transmitting member resulting from a downward load component of the side impact load.

9 Claims, 8 Drawing Sheets

U.S. PATENT DOCUMENTS

| | | | |
|---|---|---|---|
| 6,609,749 B1 * | 8/2003 | Rajasingham | 296/190.04 |
| 6,644,723 B2 * | 11/2003 | Motozawa | 296/187.12 |
| 6,761,402 B1 * | 7/2004 | Muraishi | 297/216.1 |
| 6,786,534 B1 * | 9/2004 | Peng | 296/187.08 |
| 6,857,698 B2 * | 2/2005 | Saberan et al. | 297/216.13 |
| 6,869,132 B2 * | 3/2005 | Wang et al. | 296/187.12 |
| 7,077,471 B2 * | 7/2006 | Schumann et al. | 297/216.1 |
| 7,104,592 B2 * | 9/2006 | Song | 296/187.12 |

FOREIGN PATENT DOCUMENTS

JP     2001-130446     5/2001

\* cited by examiner

SIDE IMPACT LOAD TRANSMITTING STRUCTURE

CROSS-REFERENCE TO RELATED APPLICATION

This application claims priority under 35 USC 119 from Japanese Patent Application No. 2005-068117, the disclosure of which is incorporated by reference herein.

BACKGROUND OF THE INVENTION

1. Field of the Invention

The present invention relates to a side impact load transmitting structure configured to transmit and receive, from a pillar and through a seat frame to a tunnel portion of a floor panel, a load acting on a vehicle body at the time of a side impact collision.

2. Description of the Related Art

Conventionally, as a structure that receives a load acting on a vehicle body at the time of a side impact collision, a structure has been disclosed which is configured to transmit a side impact load to a tunnel with a load direction deflecting member disposed on a seat, and where the load deflecting member and a pillar are fitted together at that time (e.g., see Japanese Patent Application Publication (JP-A) No. 2001-130446).

However, this conventional structure is configured to suppress the outer side (collision side) of the seat in the vehicle width direction from rising up at the time of a side impact collision, and no solutions are suggested in regard to when the collision side of the load transmitting member moves downward.

SUMMARY OF THE INVENTION

In view of this circumstance, the present invention provides a side impact load transmitting structure that is configured to suppress the downward movement of the load transmitting member at the time of a side impact collision to allow more of the side impact load to be transmitted to the tunnel portion through the load transmitting member and which can reliably ensure a load transmission path.

One aspect of the invention provides a side impact load transmitting structure including: a vehicular seat disposed in a cabin; a tunnel portion that is disposed such that it protrudes upward into the cabin and extends in a front-rear direction of a vehicle body; a load transmitting member including a load receiving portion that is disposed at the underside of the vehicular seat and receives a side impact load acting on a vehicle body side portion at the time of a side impact collision, with the load transmitting member being configured to transmit the side impact load received by the load receiving portion to the tunnel portion; and a downward movement suppressing member that suppresses the downward movement of the load transmitting member resulting from a downward load component of the side impact load.

In this aspect, even if a downward load component arises in a side impact load at the time of a side impact collision and the downward load component acts on the load transmitting member, the downward movement of the load transmitting member is suppressed by the downward movement suppressing member. For this reason, there is little positional displacement of the load transmitting member. Consequently, more of the side impact load is transmitted to the tunnel portion through the load transmitting member.

That is, the side impact load from another vehicle colliding with the vehicle disposed with the side impact load transmitting structure of this aspect is received not only by the vehicle body side portion but also by the tunnel portion. For this reason, a load transmission path with respect to the side impact load is reliably ensured, and the other vehicle can be pushed back in the vehicle width direction (a sufficient reaction force is imparted to the other vehicle). For this reason, there is little ingression of the vehicle side portion into the cabin.

In this side impact load transmitting structure, the downward movement suppressing member may be disposed at a position different from that of the load receiving portion.

Conventionally, in a configuration configured to cause the vehicle body side portion and the load receiving portion of the load transmitting member to directly engage with each other at the time of a side impact collision, the movement of the load transmitting member could not be suppressed unless the vehicle body side portion and the load receiving portion correctly engaged with each other, which is an extremely limited collision condition. However, in the configuration of this aspect of the present invention, the downward movement suppressing member is disposed at a position different from that of the load receiving portion of the load transmitting member. For this reason, the downward movement of the load transmitting member can be suppressed without dependence on the way in which the vehicle body side portion and the load receiving portion contact each other.

In the side impact load transmitting structure of the present invention, the downward movement suppressing member may include a support member disposed at the underside of the load transmitting member.

In this configuration, when the downward load component of the side impact load acts on the load transmitting member, the load transmitting member becomes supported by the support member and the downward movement of the load transmitting member is suppressed. For this reason, there is little positional displacement of the load transmitting member. Consequently, more of the side impact load is transmitted to the tunnel portion through the load transmitting member.

Because positional displacement of the load transmitting member is suppressed by disposing the support member at the underside of the load transmitting member, a load transmission path with respect to the side impact load can be ensured at a low cost.

The support member may be disposed between the load transmitting member and a seat rail that is positioned at an outer side in the width direction of the vehicle body and supports the vehicular seat such that the vehicular seat is slidable in the vehicle front-rear direction.

In this configuration, when the downward load component of the side impact load acts on the load transmitting member, the load transmitting member becomes supported by the support member disposed between the load transmitting member and the seat rail. The downward load component is transmitted by a floor panel through the support member and the seat rail and received. Thus, there is less positional displacement of the load transmitting member because the downward movement of the load transmitting member is suppressed, and more of the side impact load is transmitted to the tunnel portion.

Also, because the support member is disposed between the load transmitting member and the seat rail, and not attached to the floor panel, it can be configured as a seat unit. For this reason, the ease with which the seat can be attached to the vehicle body is excellent.

The support member may also be integrally disposed on the load transmitting member.

In this configuration, the ease with which the seat unit can be assembled is just as excellent as has conventionally been the case, because the support member is integrally disposed on the load transmitting member.

The downward movement suppressing member may also include an engagement portion disposed on the load transmitting member such that the engagement portion engages with the vehicle body side portion from above when the downward load component acts on the load transmitting member.

In this configuration, the engagement portion of the load transmitting member and the vehicle body side portion do not contact each other prior to the occurrence of a side impact collision. When the vehicle body side portion becomes deformed into the cabin due to a side impact collision and the downward load component of the side impact load acts on the load transmitting member, the engagement portion of the load transmitting member engages with the vehicle body side portion from above. When this happens, the downward load component acting on the load transmitting member from the vehicle body side portion again acts on the vehicle body side portion through the engagement portion of the load transmitting member, and eventually the vehicle body side portion receives the downward load component.

Thus, there is less positional displacement of the load transmitting member because the downward movement of the load transmitting member is suppressed, and more of the side impact load is transmitted to the tunnel portion.

It is preferable for the engagement portion of the load transmitting member to be engageable with the vehicle body side portion in the occurrence of a side impact collision regardless of how the front-rear position or the height of the seat is adjusted.

The downward movement suppressing member may be configured to include: a stopper portion disposed at the cabin side of the vehicle body side portion; and an engagement portion that is disposed on the load transmitting member and engages with the stopper portion from above when the vehicle body side portion is deformed at the time of the side impact collision and the stopper portion ingresses into the cabin.

In this configuration, when the downward load component of the side impact load acts on the load transmitting member due to a side impact collision and the load transmitting member moves downward a given amount, the engagement portion of the load transmitting member engages with the stopper portion of the vehicle body side portion from above such that they mutually support each other.

Thus, there is less positional displacement of the load transmitting member because the downward movement of the load transmitting member is suppressed, and more of the side impact load is transmitted to the tunnel portion.

It is preferable for the engagement portion of the load transmitting member to be engageable with the stopper portion in the occurrence of a side impact collision regardless of how the front-rear position or height of the seat is adjusted. It is preferable for the range of the stopper portion in the vehicle body front-rear direction to be the range in which the engagement portion of the load transmitting member moves in accompaniment with the front-rear movement of the seat, for example, so that the height of the seat can be adjusted without relation to the load transmitting member.

The downward movement suppressing member may include a deformable engagement member that is disposed on the vehicle body side portion and is deformed at the time of the side impact collision such that the deformable engagement member contacts the load receiving portion of the load transmitting member and engages with the load receiving portion.

In this configuration, when the vehicle body side portion is deformed at the time of a side impact collision and the deformable engagement member contacts the load receiving portion of the load transmitting member, the deformable engagement portion is deformed by the reaction force from the load receiving portion, and the load receiving portion becomes embedded in the deformable engagement portion such that they are mutually engaged.

Thus, there is less positional displacement of the load transmitting member because the downward movement of the load transmitting member is suppressed, and more of the side impact load is transmitted to the tunnel portion.

As described above, according to the side impact load transmitting structure of the present invention, there is the excellent effect that the downward movement of the load transmitting member at the time of a side impact collision is suppressed to allow more of the side impact load to be transmitted to the tunnel portion through the load transmitting member, and a load transmission path can be reliably ensured.

BRIEF DESCRIPTION OF THE DRAWINGS

Embodiments of the present invention will be described in detail based on the following figures, wherein.

DETAILED DESCRIPTION OF THE INVENTION

Embodiments of the present invention will be described below on the basis of the drawings.

FIRST EMBODIMENT

Figure 1:
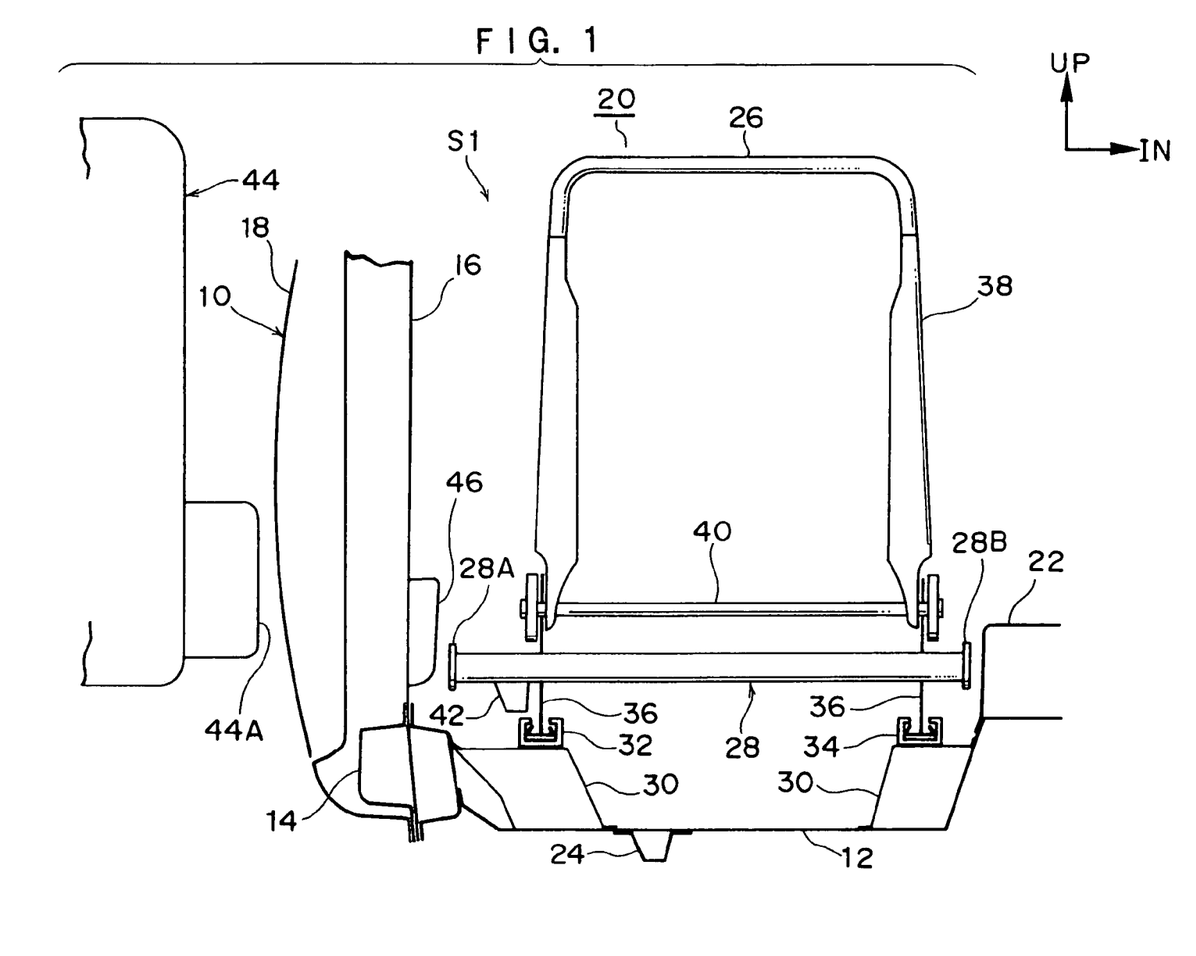
FIG. 1 is a cross-sectional view showing a side impact load transmitting structure pertaining to a first embodiment of the invention prior to a side impact collision.

In FIG. 1, a vehicle body 10 includes a floor panel 12, a locker 14 disposed on a vehicle body side portion of the floor panel 12, a pillar 16 (e.g., a center pillar) disposed such that it rises upward from the locker 14, and an outer panel 18 of the vehicle body side portion. The area above the floor panel 12 in the vehicle body 10 serves as a cabin 20.

A tunnel portion 22, which is disposed such that it protrudes upward inside the cabin 20 and extends in the front-rear direction of the vehicle body 10, is formed in the substantial center of the floor panel 12 in the vehicle body width direction. An under-floor reinforcement 24 that extends in the vehicle body front-rear direction, for example, is disposed on the undersurface of the floor panel 12.

A side impact load transmitting structure S1 pertaining to the present embodiment includes a vehicular seat 26 (which will be referred to below simply as "the seat 26"; what is illustrated is the seat frame) disposed inside the cabin 20 (e.g., on the floor panel 12), the tunnel portion 22, and a load transmitting member 28 that is disposed on the seat 26 and configured to transmit, to the tunnel portion 22, a side impact load F (FIG. 2) acting on the pillar 16 (vehicle body side portion), for example, at the time of a side impact collision.

The seat 26 is disposed on the floor panel 12 between the pillar 16 and the tunnel portion 22, for example, and attached to a pair of leg portions 36 that are movable in the vehicle body front-rear direction along a pair of seat rails 32 and 34 disposed on brackets 30 on the floor panel 12. Thus, the seat 26 is configured such that its position is adjustable in the vehicle body front-rear direction within a predetermined range. It will be noted that the seat 26 may also be configured such that the height of the seat surface is adjustable. A support shaft 40 of a seat back 38 of the seat 26 is positioned above the load transmitting member 28.

As shown in FIG. 1, the load transmitting member 28 is a pipe-like member, for example. The load transmitting member 28 is fixed parallel to the vehicle body width direction (i.e., horizontally) on the leg portions 36 between the seat 26 and the seat rails 32 and 34, and is disposed such that a load receiving portion 28A, which is the outer end portion of the load transmitting member 28, and an inner end portion 28B protrude from the leg portions 36. The load receiving portion 28A and the inner end portion 28B have expanded diameters and are formed in flange-like shapes. Ordinarily (prior to a side impact collision), the load receiving portion 28A and the inner end portion 28B are separated from the pillar 16 and the tunnel portion 22. Because the extent to which the load receiving portion 28A and the inner end portion 28B protrude from the leg portions 36 is determined by the interval between the seat 26 and the pillar 16, the interval between the seat 26 and the tunnel portion 22, and the allowable deformation of the pillar 16 at the time of a side impact collision, it is not limited to that which is illustrated.

A support member 42 (downward movement suppressing member) is integrally formed on the load transmitting member 28 by welding, for example, on the undersurface of the load transmitting member 28 between the load receiving portion 28A of the load transmitting member 28 and the seat rail 32 near the pillar 16. The support member 42 suppresses the downward movement of the load transmitting member 28 resulting from a downward load component Fd of the side impact load F (see FIG. 2) at the time of a side impact collision.

Figure 2:
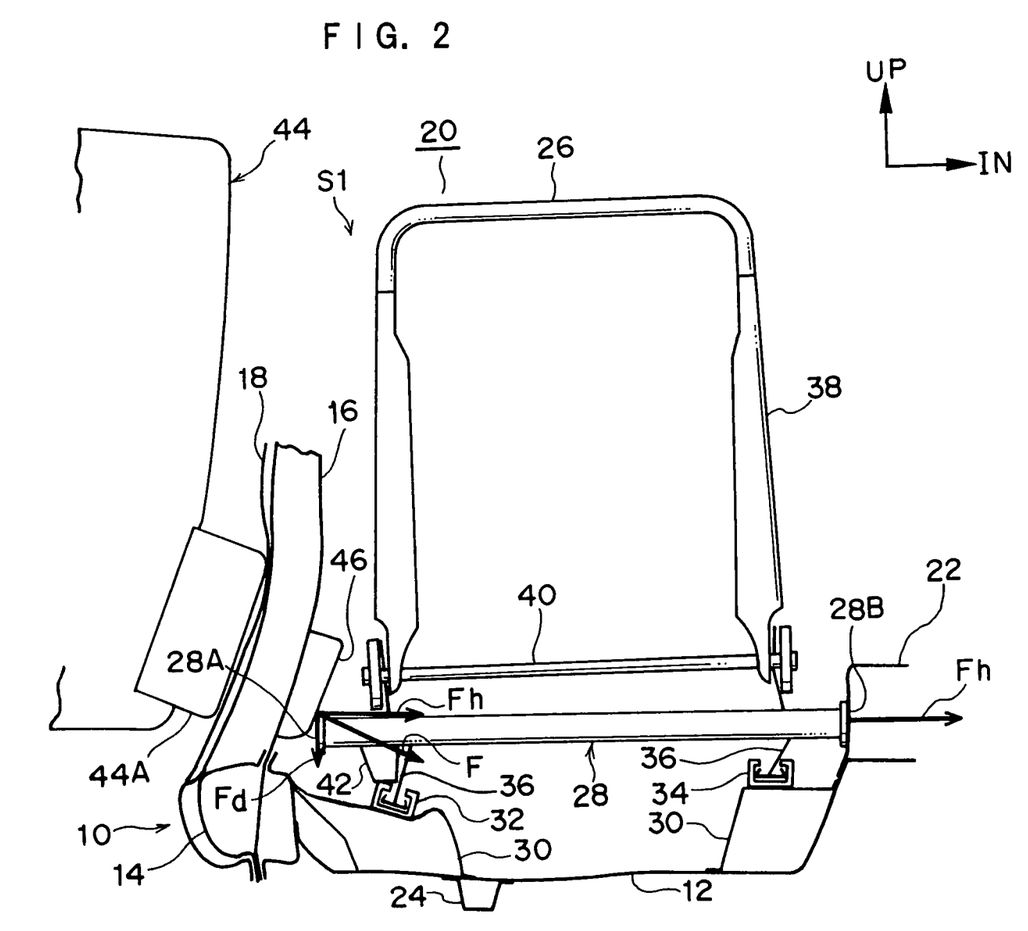
FIG. 2 is a cross-sectional view showing the side impact load transmitting structure pertaining to the first embodiment of the invention after a side impact collision resulting from another vehicle.

As shown in FIG. 2, the downward load component Fd of the side impact load F becomes particularly large when another vehicle 44 whose bumper 44A is attached at a high position, such as an SUV (Sport Utility Vehicle) or RV (Recreational Vehicle), collides from the side with a common passenger car where the attachment position of the seat 26 in the vehicle body 10 is low, such as in a sedan.

The support member 42 is a block-like member, for example, that has a strength that can withstand the downward load component Fd. The position of the support member 42 in the vehicle body width direction is closer to the pillar 16 than the seat rail 32, for example. As shown in FIG. 2, the reason for this is to ensure that when the load transmitting member 28 is pushed inward of the vehicle body 10 by the pillar 16 at the time of a side impact collision and the inner end portion 28B contacts the tunnel portion 22, the support member 42 rides up onto the seat rail 32. It will be noted that the support member 42 may also contact the floor panel 12 and the bracket 30.

In order to reduce how far the load transmitting member 28 moves downward at the time of a side impact, it is preferable for the interval between the support member 42 and the seat rail 32 to be as small as possible during an ordinary time. However, in consideration of friction when the front-rear position of the seat 26 is adjusted, it is better for there to be a slight initial clearance between the support member 42 and the seat rail 32 than for the support member 42 and the seat rail 32 to contact each other from the start.

When the seat 26 includes the function of adjusting the height of the seat surface, it is preferable for the load transmitting member 28 to not move up and down even when the seat 26 is moved up and down (such that the height adjustment is conducted without relation to the load transmitting member 28). For this reason, the function of adjusting the seat surface height is preferably disposed at a position between the seat 26 and the position where the load transmitting member 28 is attached to the leg portions 36.

A contact portion 46 (e.g., a retractor cover) that has a block-like shape, for example, is disposed at a position slightly diagonally above the front surface of the load receiving portion 28A of the load transmitting member 28. The contact portion 46 contacts the load receiving portion 28A when the pillar 16 is deformed inward of the vehicle body 10 at the time of a side impact collision resulting from the other vehicle 44.

The contact portion 46 may be something like the retractor cover of a seat belt, for example. If the contact portion 46 is not disposed, it is preferable to configure the side impact load transmitting mechanism such that part of the pillar 16 contacts the load receiving portion 28A at the time of a side impact collision so that the side impact load F is transmitted to the load transmitting member 28.

Action of the First Embodiment

As shown in FIG. 2, when the other vehicle 44 including the bumper 44A at a position higher than the seat 26 collides from the side at the position of the pillar 16 of the vehicle body 10 including the side impact load transmitting structure S1, the portion of the pillar 16 below the collision position is bent and deformed such that it collapses inside the vehicle body 10, with the vicinity of the relatively strong locker 14 as the support point. Thus, the contact portion 46 of the pillar 16 moves diagonally downward, approaches the load transmitting member 28, and contacts the load transmitting member 28 from diagonally above the load receiving portion 28A. At this time, the side impact load F acting diagonally downward on the load receiving portion 28A can be separated into the downward load component Fd and a horizontal load component Fh.

The load receiving portion 28A of the load transmitting member 28 is pushed downward by the downward load component Fd. At this time, the support member 42 moves downward a distance equal to the initial clearance between the support member 42 and the seat rail 32, contacts the upper portion of the seat rail 32, and becomes supported by the floor panel 12 and the bracket 30 to which the seat rail 32 is attached.

Thus, there is little positional displacement of the load transmitting member 28 because any further downward movement of the load transmitting member 28 is suppressed. The load transmitting member 28 virtually maintains its horizontal orientation, is pushed inward of the vehicle body 10 by the horizontal load component Fh, and the inner end portion 28B contacts the tunnel portion 22. Thus, because a load transmission path is ensured, the horizontal load component Fh becomes transmittable to the tunnel portion 22 through the load transmitting member 28. The pillar 16 becomes supported and reinforced by the tunnel portion 22 and the load transmitting member 28.

In this manner, in the vehicle body 10 including the side impact load transmitting structure S1, a load transmission path with respect to the side impact load is reliably ensured, and the other vehicle 44 colliding with the vehicle body 10 can be pushed back (a sufficient reaction force is imparted to the other vehicle 44) in the vehicle width direction. For this reason, there is little ingression of the pillar 16 into the cabin 20.

Conventionally, in a configuration configured to cause the vehicle body side portion and the load receiving portion of the load transmitting member to directly engage with each other at the time of a side impact collision, the movement of the load transmitting member could not be suppressed unless the vehicle body side portion and the load receiving portion correctly engaged with each other, which is an extremely limited collision condition. However, in the side impact load transmitting structure S1 pertaining to the present embodiment, the support member 42 is disposed at a position different from that of the load receiving portion 28A of the load transmitting member 28. For this reason, the downward movement of the load transmitting member 28 can be suppressed without dependence on the way in which the pillar 16 and the load receiving portion 28A contact each other.

It will be noted that when the seat 26 is at the inner side of a door (not shown) and the other vehicle 44 collides with the door from the side, the door is supported by the load transmitting member 28 and the tunnel portion 22, whereby ingression of the door into the cabin 20 is deterred.

Because the support member 42 is disposed integrally with the load transmitting member 28 at the underside of the load transmitting member 28, it is inexpensive. Also, because the support member 42 can be configured as a seat 26 unit, the ease with which the seat 26 can be assembled and the ease with which the seat 26 can be attached to the vehicle body 10 are excellent.

SECOND EMBODIMENT

Figure 3:
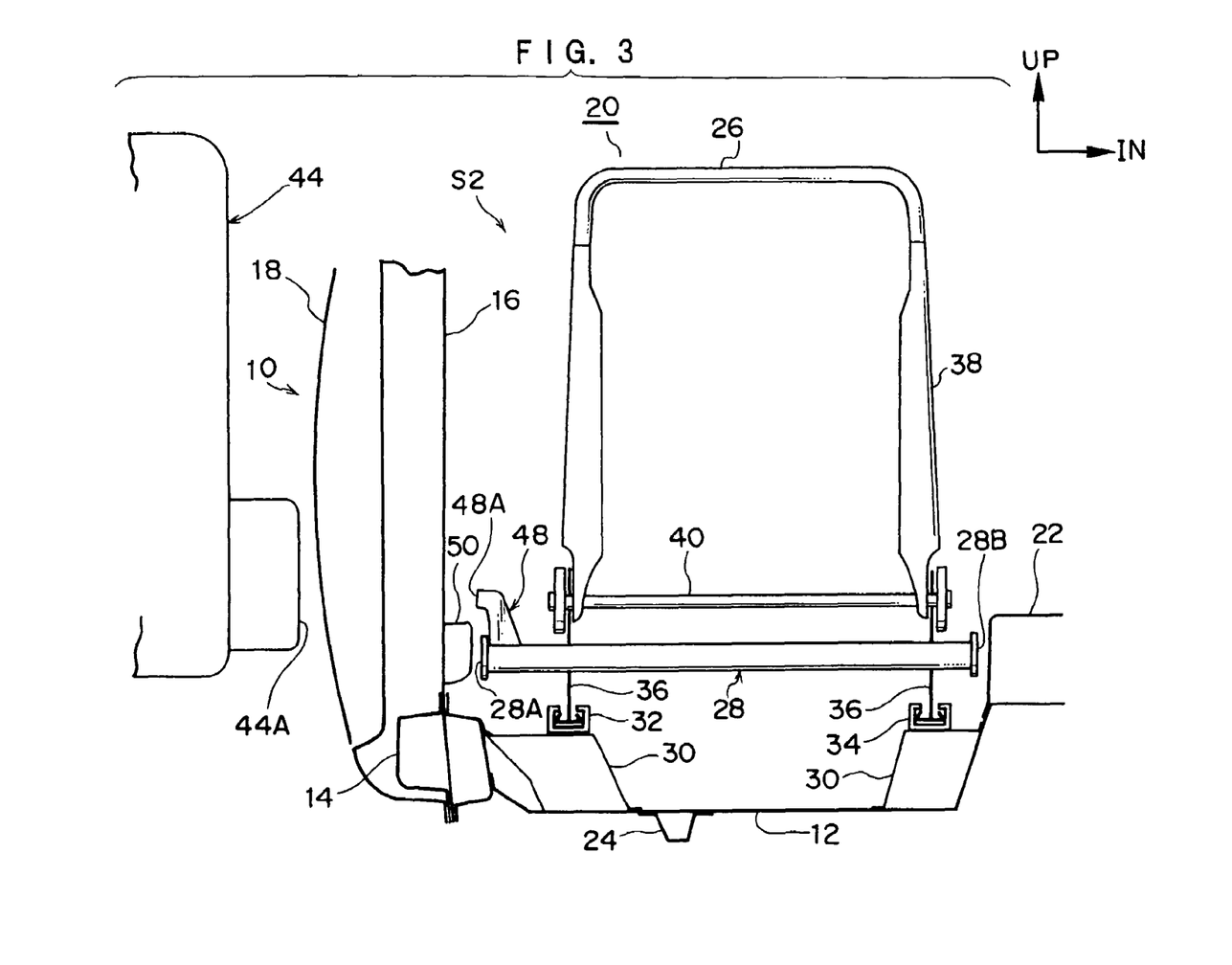
FIG. 3 is a cross-sectional view showing a side impact load transmitting structure pertaining to a second embodiment of the invention prior to a side impact collision.

In FIG. 3, a side impact load transmitting structure S2 pertaining to a second embodiment of the invention includes, as a downward movement suppressing member, a stopper portion 50 (e.g., a retractor cover), which is disposed at the cabin 20 side of the pillar 16 (vehicle body side portion), and an engagement portion 48. The engagement portion 48 is disposed on the load transmitting member 28 and engages, only from above, with the stopper portion 50 when the pillar 16 is deformed at the time of a side impact collision and the stopper portion 50 ingresses into the cabin 20.

The stopper portion 50 is disposed such that it protrudes into the cabin 20 at a position substantially corresponding to the front surface of the load receiving portion 28A of the load transmitting member 28. It will be noted that the stopper portion 50 is not limited to protruding into the cabin 20 because it suffices as long as the stopper portion 50 is engageable with the engagement portion 48 of the load transmitting member 28. For example, the stopper portion 50 may also include a plate-like body or rod-like body disposed parallel to the vehicle body front-rear direction.

It is preferable for the engagement portion 48 of the load transmitting member 28 to be engageable with the vehicle body side portion in the occurrence of a side impact collision regardless of how the front-rear position of the seat 26 is adjusted. Consequently, the range of the stopper portion 50 in the vehicle body front-rear direction is the range in which the engagement portion 48 of the load transmitting member 28 moves in accompaniment with the front-rear movement of the seat 26. Consequently, when the moving range of the load transmitting member 28 accompanying the adjustment of the front-rear position of the seat 26 is across a range from the door (not shown) to the pillar 16, for example, it is preferable to dispose the stopper portion 50 not only on the pillar 16 but also on the inner surface of the door.

The engagement portion 48 is a hook-like member that is disposed vertically upward from the vicinity of the load receiving portion 28A of the load transmitting member 28, for example, and includes a leading end 48A that protrudes further toward the pillar 16 than the load receiving portion 28A. The engagement portion 48 is disposed integrally with the load transmitting member 28, for example.

In the side impact load transmitting structure S2, ordinarily (prior to the occurrence of a side impact collision) the engagement portion 48 of the load transmitting member 28 and the stopper portion 50 of the pillar 16 do not contact each other. When the downward load component Fd acts on the load transmitting member 28 due to a side impact collision, the engagement portion 48 engages with the stopper portion 50 of the pillar 16 (vehicle body side portion) only from above, for example.

Because the remaining configuration of the side impact load transmitting structure S2 is the same as that in the first embodiment, the same reference numerals are given to the same portions in the drawings and description of those same portions is omitted.

Action of the Second Embodiment

Figure 4:
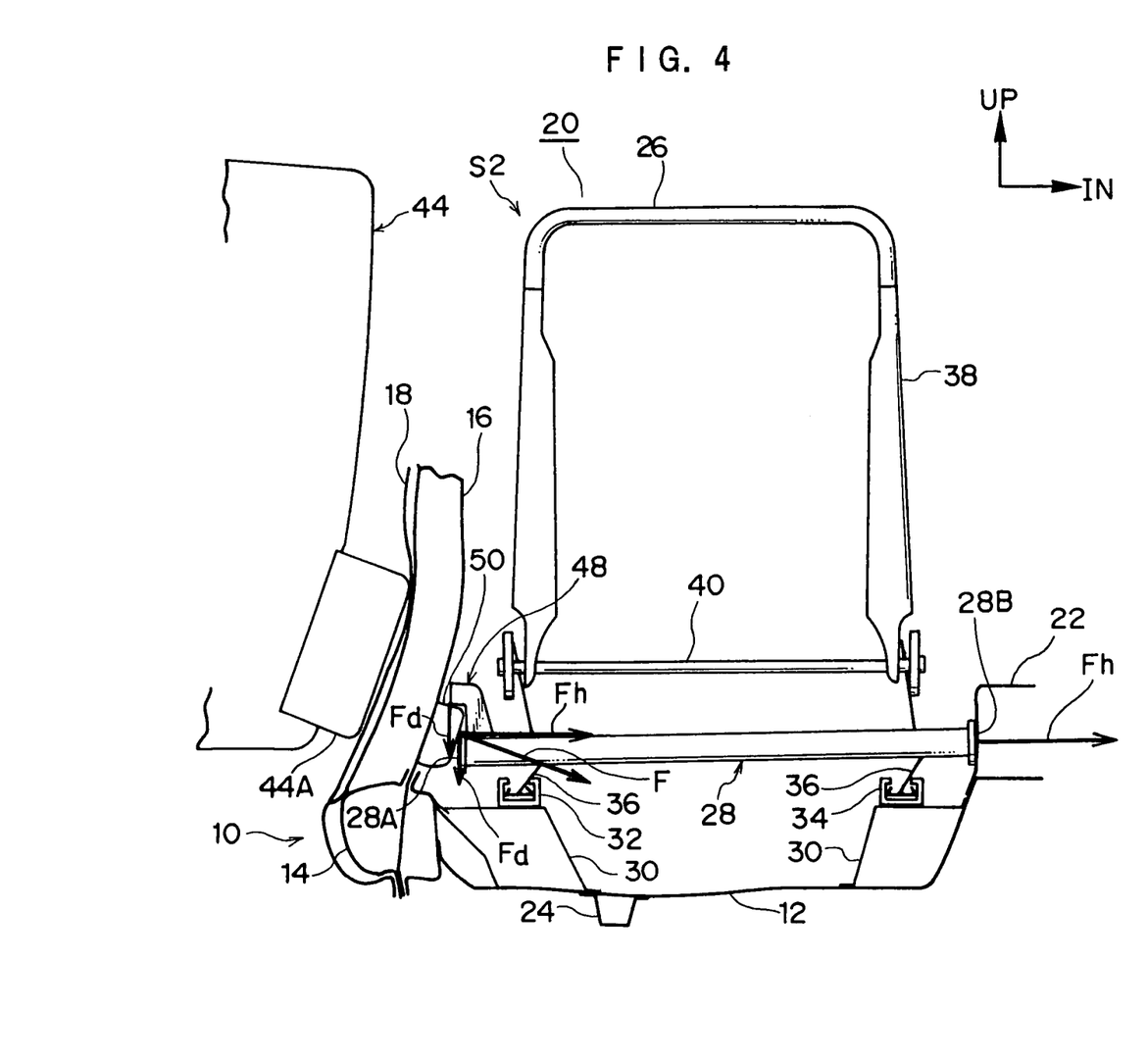
FIG. 4 is a cross-sectional view showing the side impact load transmitting structure pertaining to the second embodiment of the invention after a side impact collision resulting from another vehicle.

As shown in FIG. 4, when the other vehicle 44 collides from the side at the position of the pillar 16 of the vehicle body 10 including the side impact load transmitting structure S2, the stopper portion 50 of the bent and deformed pillar 16 moves diagonally downward, approaches the load transmitting member 28, and contacts the load transmitting member 28 from diagonally above the load receiving portion 28A.

The load receiving portion 28A of the load transmitting member 28 is pushed downward by the downward load component Fd of the side impact load F. At this time, because the engagement portion 48 engages with the stopper portion 50 from above, the stopper portion 50 and the load transmitting member 28 mutually support each other.

Thus, there is little positional displacement of the load transmitting member 28 because any further downward movement of the load transmitting member 28 is suppressed. The load transmitting member 28 virtually maintains its horizontal orientation, is pushed inward of the vehicle body 10 by the horizontal load component Fh, and the inner end portion 28B contacts the tunnel portion 22. Thus, because a load transmission path is ensured, the horizontal load component Fh becomes transmittable to the tunnel portion 22 through the load transmitting member 28. The pillar 16 becomes supported and reinforced by the tunnel portion 22 and the load transmitting member 28.

THIRD EMBODIMENT

Figure 5:
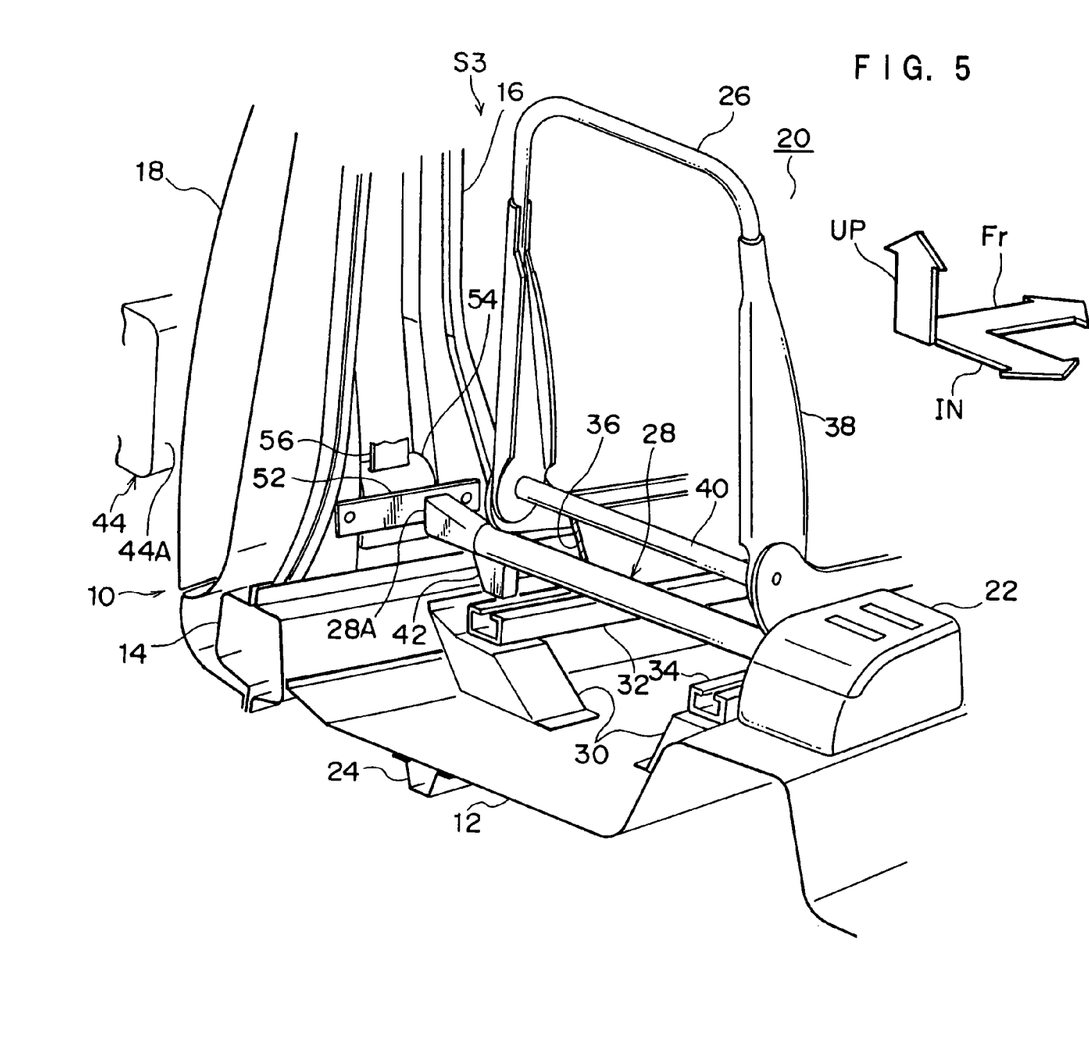
FIG. 5 is a perspective view showing a side impact load transmitting structure pertaining to a third embodiment of the invention prior to a side impact collision.
Figure 6:
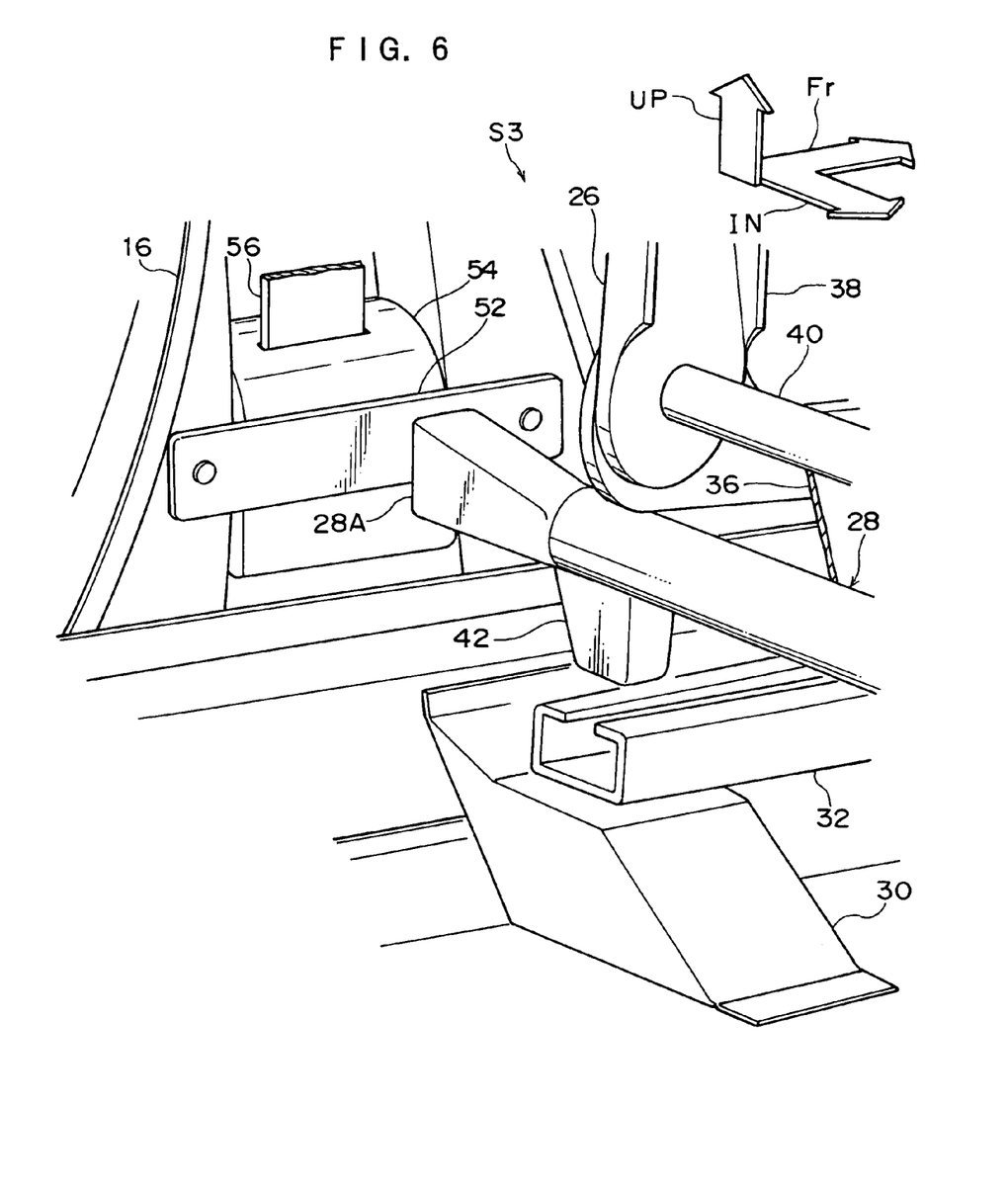
FIG. 6 is an enlarged perspective view showing the side impact load transmitting structure pertaining to the third embodiment of the invention prior to a side impact collision.

In FIGS. 5 and 6, in a side impact load transmitting structure S3 pertaining to a third embodiment of the invention, a deformable engagement member 52 that is plate-like, for example, is disposed at the cabin 20 side of the pillar 16 (vehicle body side portion), and the same support member 42 as in the first embodiment is disposed on the load transmitting member 28. The load receiving portion 28A of the load transmitting member 28, which the deformable engagement member 52 contacts at the time of a side impact collision, is formed in an inclined manner, for example, such that it spreads more greatly than the diameter of the load transmitting member 28.

The deformable engagement member 52 has a plate thickness in the vehicle body width direction, has a width in the vehicle body vertical direction, and is spot-welded to the pillar 16 such that the deformable engagement member 52 covers a retractor 54 of a seat belt 56 attached to the inside of the pillar 16.

The height position of the deformable engagement member 52 corresponds to, or is diagonally above, the front surface of the load receiving portion 28A of the load transmitting member 28, and ordinarily (prior to a side impact collision) the load receiving portion 28A and the deformable engagement member 52 are separated from each other.

As shown in FIGS. 5 and 6, the support shaft 40 of the seat back 38 of the seat 26 is positioned above the load transmitting member 28.

In FIG. 5, the load transmitting member 28 is depicted as being separated from the leg portions 36, but this is because the leg portions 36 are illustrated as being fractured in order to show the support portion 42 of the load transmitting member 28.

Because the remaining configuration of the side impact load transmitting structure S3 is the same as that in the first embodiment, the same reference numerals are given to the same portions in the drawings and description of those same portions is omitted.

Action of the Third Embodiment

Figure 7:
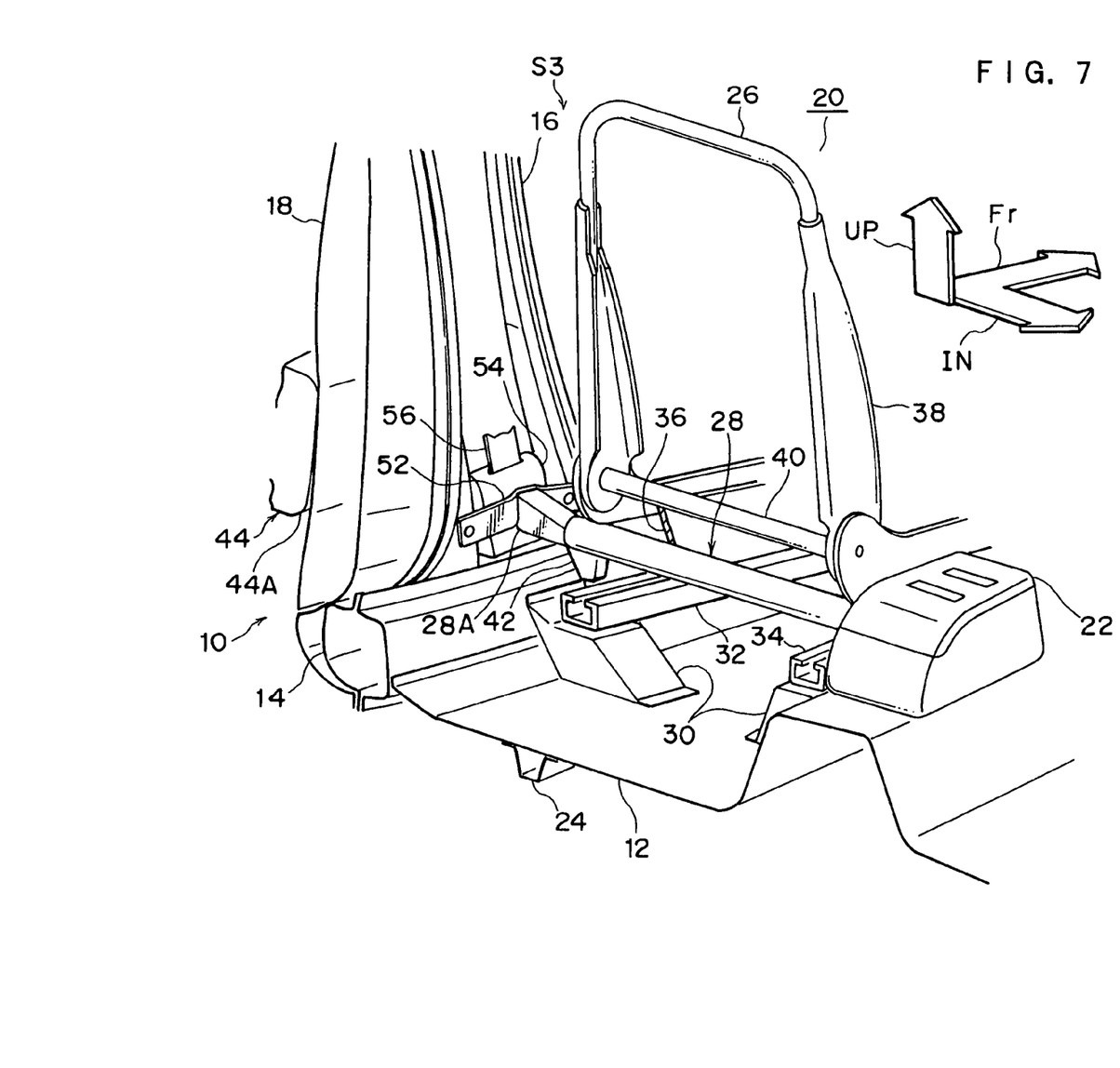
FIG. 7 is a perspective view showing a state where a vehicle body disposed with the side impact load transmitting structure pertaining to the third embodiment of the invention has been impacted from the side by another vehicle and where a pillar is deformed and a contact portion contacts a load receiving portion of a load transmitting member.
Figure 8:
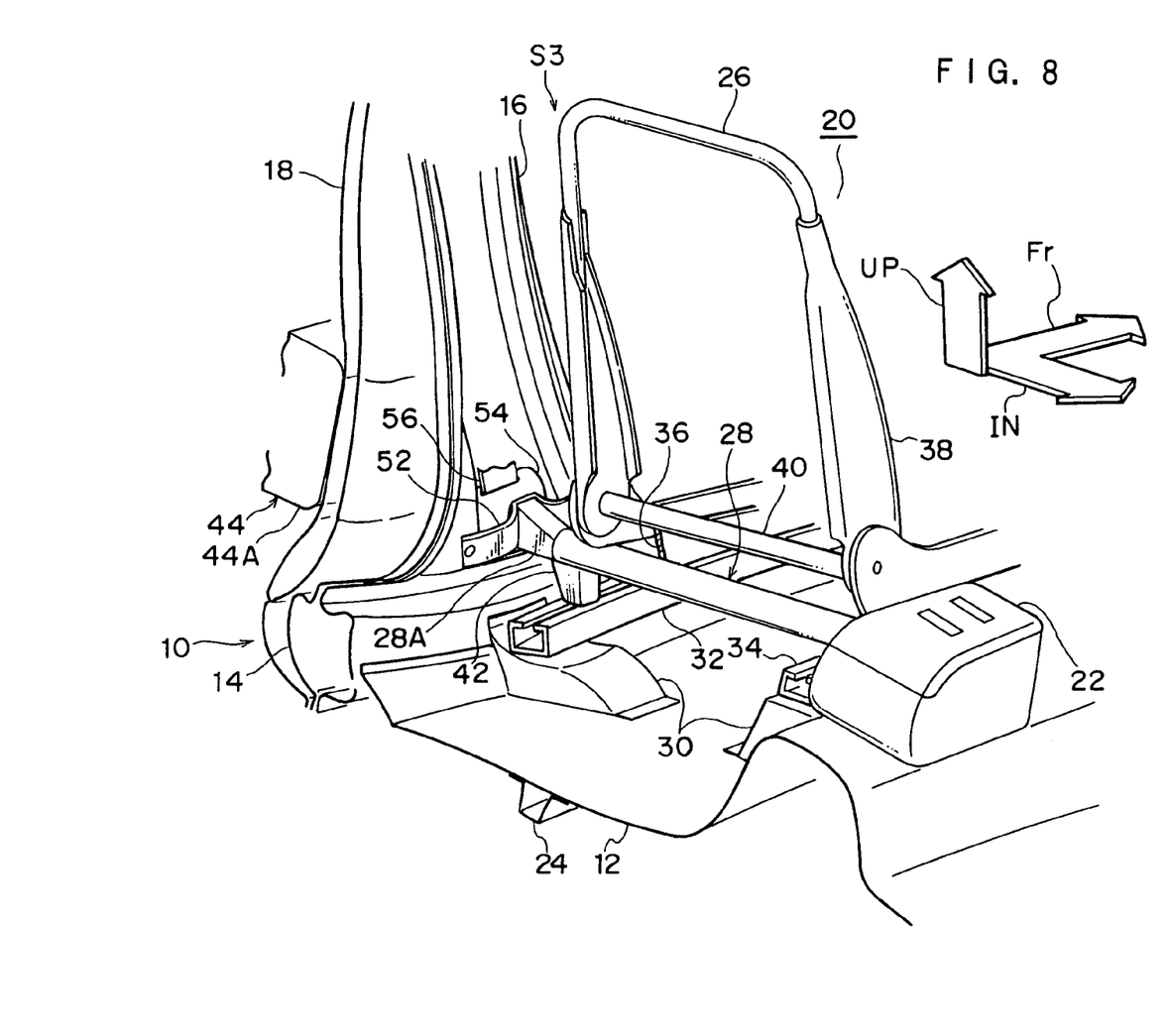
FIG. 8 is a perspective view pertaining to the third embodiment of the invention showing a state where the pillar is further deformed from the state shown in FIG. 7 and a support member contacts a seat rail.

As shown in FIGS. 5, 7 and 8, when the other vehicle 44 collides from the side at the position of the pillar 16 of the vehicle body 10 including the side impact load transmitting structure S3, the deformable engagement member 52 of the bent and deformed pillar 16 moves diagonally downward, approaches the load transmitting member 28, and contacts the load transmitting member 28 from diagonally above the load receiving portion 28A. Because the deformable engagement member 52 is a plate-like body, it is deformed along the end surface shape of the load receiving portion 28A due to the reaction force from the load receiving portion 28A, and the load receiving portion 28A becomes embedded in the deformable engagement member 52.

The load receiving portion 28A is pushed downward by the downward load component (not shown) of the side impact load. At this time, the support member 42 moves downward a distance equal to the initial clearance between the support member 42 and the seat rail 32, contacts the upper portion of the seat rail 32, and becomes supported by the floor panel 12 and the bracket 30 to which the seat rail 32 is attached.

That is, there is little positional displacement of the load transmitting member 28 because any further downward movement of the load transmitting member 28 is suppressed by the engagement resulting from the embedding of the load receiving portion 28A of the load transmitting member 28 into the deformable engagement portion 52 and by the contact between the support member 42 and the seat rail 32. The load transmitting member 28 virtually maintains its horizontal orientation, is pushed inward of the vehicle body 10 by the horizontal load component (not shown), and the inner end portion (not shown) contacts the tunnel portion 22. Thus, because a load transmission path is ensured, the horizontal load component becomes transmittable to the tunnel portion 22 through the load transmitting member 28. The pillar 16 becomes supported and reinforced by the tunnel portion 22 and the load transmitting member 28.

In this manner, in the vehicle body 10 including the side impact load transmitting structure S3, a load transmission path with respect to a side impact load is reliably ensured, and the other vehicle 44 colliding with the vehicle body 10 can be pushed back in the vehicle width direction. For this reason, there is little ingression of the pillar 16 into the cabin 20.

It will be noted that when the seat 26 is at the inner side of a door (not shown) and the other vehicle 44 collides with the door from the side, the door is supported by the load transmitting member 28 and the tunnel portion 22, whereby ingression of the door into the cabin 20 is deterred.

Although it is not illustrated, in all of the preceding embodiments, the pillar 16 is ordinarily covered by a pillar trim such that the contact portions 46 and 52 and the engagement portion 48 are not exposed. Similarly, the load transmitting member 28 is also ordinarily covered by a cover at both sides below the seat surface of the seat 26 such that it is not exposed.

Also, the load transmitting member 28 is not limited to being attached to the leg portions 36. For example, the load transmitting member 28 may also be fixedly attached to the floor panel 12 such that it does not move in accompaniment with the adjustment of the front-rear position of the seat 26. Moreover, the support member 42 is not limited to being integrally disposed on the undersurface of the load transmitting member 28. For example, the support member 42 may also be disposed on the floor panel 12 or the bracket 30 such that the support member 42 protrudes toward the load transmitting member 28.

What is claimed is:

1. A side impact load transmitting structure comprising:
    a vehicular seat disposed in a cabin;
    a tunnel portion that is disposed such that it produces upward into the cabin and extends in a front-rear direction of a vehicle body;
    a load transmitting member including a load receiving portion that is disposed at the underside of the vehicular seat and receives a side impact load acting on a vehicle body side portion at the time of a side impact collision, with the load transmitting member being configured to transmit the side impact load received by the load receiving portion directly to the tunnel portion; and a downward movement suppressing member that suppresses the downward movement of the load transmitting member resulting from a downward load component of the side impact load.

2. The side impact load transmitting structure of claim 1, wherein the downward movement suppressing member comprises a support member disposed at the underside of the load transmitting member.

3. The side impact load transmitting structure of claim 1, wherein the downward movement suppressing member comprises a support member disposed at the underside of the load transmitting member.

4. The side impact load transmitting structure of claim 2, wherein the support member is disposed between the load transmitting member and a set rail that is positioned at an outer side in the width direction of the vehicle body and supports the vehicular seat such that the vehicular seat is slidable in the vehicle front-rear direction.

5. The side impact load transmitting structure of claim 2, wherein the support member is integrally disposed on the load transmitting member.

6. The side impact load transmitting structure of claim 1, wherein the downward movement suppressing member comprises an engagement portion disposed on the load transmitting member such that the engagement portion engages with the vehicle body side portion from above when the downward load component acts on the load transmitting member.

7. The side impact load transmitting structure of claim 1, wherein the downward movement suppressing member includes a stopper portion disposed at the cabin side of the vehicle body side portion, and an engagement portion that is disposed on the load transmitting member and engages with the stopper portion from above when the vehicle body side portion is deformed at the time of the side impact collision and the stopper portion ingresses into the cabin.

8. The side impact load transmitting structure of claim 1, wherein the downward movement suppressing member comprises a deformable engagement member that is disposed on the vehicle body side portion and is deformed at the time of the side impact collision such that the deformable engagement member contacts the load receiving portion of the load transmitting member and engages with the load receiving portion.

9. The side impact load transmitting structure of claim 1, wherein the downward movement suppressing member is disposed at a position different from that of the load receiving portion.

* * * * *